US008681973B2

(12) United States Patent
Weinman (10) Patent No.: US 8,681,973 B2
(45) Date of Patent: Mar. 25, 2014

(54) METHODS, SYSTEMS, AND COMPUTER PROGRAM PRODUCTS FOR PERFORMING HOMOMORPHIC ENCRYPTION AND DECRYPTION ON INDIVIDUAL OPERATIONS

(75) Inventor: Joseph Weinman, Basking Ridge, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 314 days.

(21) Appl. No.: 12/882,753

(22) Filed: Sep. 15, 2010

(65) Prior Publication Data
US 2012/0066510 A1 Mar. 15, 2012

(51) Int. Cl.
*H04L 29/06* (2006.01)
(52) U.S. Cl.
USPC .............................................. 380/28; 713/189
(58) Field of Classification Search
USPC .............................................. 713/189; 380/28
See application file for complete search history.

(56) References Cited

U.S. PATENT DOCUMENTS

| | | | | | |
|---|---|---|---|---|---|
| 2,902,675 | A | * | 9/1959 | Shaw et al. | 235/59 A |
| 3,611,307 | A | * | 10/1971 | Podvin et al. | 710/244 |
| 3,633,018 | A | * | 1/1972 | Ling | 708/654 |
| 4,442,484 | A | * | 4/1984 | Childs et al. | 711/163 |
| 4,547,849 | A | * | 10/1985 | Louie et al. | 710/3 |
| 4,731,736 | A | * | 3/1988 | Mothersole et al. | 710/110 |
| 4,999,801 | A | * | 3/1991 | Katsuno | 708/500 |
| 5,039,603 | A | * | 8/1991 | Pocius | 434/188 |
| 5,270,956 | A | * | 12/1993 | Oruc et al. | 708/491 |
| 5,341,321 | A | * | 8/1994 | Karp et al. | 708/500 |
| 5,790,599 | A | * | 8/1998 | Wright et al. | 375/240 |
| 5,796,833 | A | * | 8/1998 | Chen et al. | 713/156 |
| 5,991,414 | A | * | 11/1999 | Garay et al. | 713/165 |
| 7,254,600 | B2 | * | 8/2007 | Liardet | 708/491 |
| 7,284,267 | B1 | * | 10/2007 | McArdle et al. | 726/11 |
| 7,290,288 | B2 | * | 10/2007 | Gregg et al. | 726/28 |

(Continued)

FOREIGN PATENT DOCUMENTS

| | | | | |
|---|---|---|---|---|
| JP | 60114047 A | * | 6/1985 | H04L 9/00 |
| JP | 2011227193 A | * | 11/2011 | |
| JP | 2011232727 A | * | 11/2011 | |

OTHER PUBLICATIONS

Tapan K. Nayak, Bimal Sinha, and Laura Zayatz. "Statistical Properties of Multiplicative Noise Masking for Confidentiality Protection." Statistical Research Division, U.S. Census Bureau. Research Report Series, Statistics #2010-05. Mar. 3, 2010.*

(Continued)

*Primary Examiner* — Oscar Louie
*Assistant Examiner* — Benjamin Jenkins
(74) *Attorney, Agent, or Firm* — Myers Bigel Sibley & Sajovec (57) ABSTRACT

A method of processing data includes receiving a request for an operand from a second processor at a first processor, encrypting the operand that has been requested using the first processor responsive to receiving the request for the operand, sending the operand that has been encrypted from the first processor to the second processor, receiving a result from the second processor at the first processor, the result generated from a single homomorphic operation being performed using the operand sent to the second processor, decrypting the result received from the second processor at the first processor, and receiving a request for the result that has been decrypted from the second processor at the first processor.

20 Claims, 10 Drawing Sheets

(56) References Cited

U.S. PATENT DOCUMENTS

| | | | |
|---|---|---|---|
| 7,472,105 B2* | 12/2008 | Staddon et al. .................... 1/1 |
| 7,571,320 B2* | 8/2009 | Davis ........................... 713/169 |
| 7,730,294 B2* | 6/2010 | Asnis ........................... 713/100 |
| 7,860,245 B2* | 12/2010 | Kerschbaum et al. ........... 380/33 |
| 7,945,784 B1* | 5/2011 | Masinter et al. .............. 713/180 |
| 2002/0041684 A1* | 4/2002 | Nishioka ......................... 380/30 |
| 2002/0073318 A1* | 6/2002 | Gennaro et al. .............. 713/176 |
| 2003/0056118 A1* | 3/2003 | Troyansky et al. ............ 713/201 |
| 2003/0084309 A1* | 5/2003 | Kohn ............................ 713/189 |
| 2004/0003278 A1* | 1/2004 | Chen et al. .................... 713/200 |
| 2005/0238034 A1* | 10/2005 | Gillespie et al. .............. 370/401 |
| 2006/0050868 A1* | 3/2006 | Bockes et al. ................... 380/28 |
| 2006/0085651 A1* | 4/2006 | Staddon et al. ............... 713/193 |
| 2006/0245587 A1* | 11/2006 | Pinkas et al. .................... 380/28 |
| 2007/0005676 A1* | 1/2007 | Henry ........................... 708/552 |
| 2007/0116283 A1* | 5/2007 | Tuyls et al. .................... 380/255 |
| 2007/0140479 A1* | 6/2007 | Wang et al. ...................... 380/30 |
| 2008/0114681 A1* | 5/2008 | Staddon et al. .................. 705/50 |
| 2008/0144832 A1* | 6/2008 | Kerschbaum ................ 380/277 |
| 2008/0205641 A1* | 8/2008 | Chang et al. ..................... 380/42 |
| 2009/0089789 A1* | 4/2009 | Faltings et al. ............... 718/104 |
| 2009/0327141 A1* | 12/2009 | Rabin et al. ...................... 705/75 |
| 2010/0049970 A1* | 2/2010 | Fraleigh et al. ............... 713/156 |
| 2010/0091984 A1* | 4/2010 | Kerschbaum et al. .......... 380/30 |
| 2010/0329454 A1* | 12/2010 | Takashima ....................... 380/44 |
| 2011/0023048 A1* | 1/2011 | Srinivasan .................... 718/105 |
| 2011/0060901 A1* | 3/2011 | Troncoso Pastoriza et al. ............................ 713/150 |
| 2011/0075846 A1* | 3/2011 | Kerschbaum ................ 380/278 |
| 2011/0085658 A1* | 4/2011 | Kerschbaum ................ 380/30 |
| 2011/0135096 A1* | 6/2011 | Rane et al. .................... 380/278 |
| 2011/0211692 A1* | 9/2011 | Raykova et al. ................ 380/46 |
| 2011/0243320 A1* | 10/2011 | Halevi et al. ................... 380/30 |
| 2011/0264920 A1* | 10/2011 | Rieffel et al. ................. 713/189 |
| 2012/0002811 A1* | 1/2012 | Smart ........................... 380/255 |
| 2012/0163584 A1* | 6/2012 | Adjedj ............................ 380/28 |
| 2012/0213359 A1* | 8/2012 | Troncoso Pastoriza et al. ............................ 380/28 |

OTHER PUBLICATIONS

K. W. Yu, and Tong Lai Yu. "Superimposing Encrypted Data." Communications of the ACM. Volume 34 Issue 2, Feb. 1991. pp. 48-54.*

Krishnamurty Muralidhar, Rahul Parsa, and Rathindra Sarathy. "A General Additive Data Perturbation Method for Database Security." Management Science, vol. 45, No. 10, Oct. 1999. pp. 1399-1415.*

Yu Yu, Jussipekka Leiwo, and Benjamin Premkumar. "A Study on the Security of Privacy Homomorphism." International Journal of Network Security, vol. 6, No. 1, pp. 33-39, Jan. 2008.*

C. Orlandi, A. Piva, and M. Barni. "Oblivious Neural Network Computing via Homomorphic Encryption." EURASIP Journal on Information Security, vol. 2007, Article ID 37343, 11 pages.*

Caroline Fontaine and Fabien Galand. "A survey of homomorphic encryption for nonspecialists." EURASIP Journal on Information Security. vol. 2007, Jan. 2007. Article No. 15.*

Qingsong Ye, Huaxiong Wang, and Christophe Tartary. "Privacy-Preserving Distributed Set Intersection." ARES '08 Proceedings of the Third International Conference on Availability, Reliability and Security. 2008. pp. 1332-1339.*

Andrei D. Polyanin and Alexander V. Manzhirov. "Handbook of Mathematics for Engineers and Scientists." Chapman and Hall/CRC. 2006. pp. 3-18.*

Souptik Datta. "On Random Additive Perturbation for Privacy Preserving Data Mining." Masters Thesis. 2004.*

Josep Domingo-Ferrer. "A Provably Secure Additive and Multiplicative Privacy Homomorphism." ISC '02 Proceedings of the 5th International Conference on Information Security. 2002. pp. 471-483.*

Niv Ahituv, Yeheskel Lapid, and Seev Neumann. "Processing Encrypted Data." Communications of the ACM, vol. 30, No. 9, Sep. 1987. pp. 777-780.*

"Intel Architecture Software Developer's Manual. vol. 2: Instruction Set Reference." Intel Corporation. 1999.*

Marina Blanton. "Empirical Evaluation of Secture Two-Party Computation Models." CERIAS TR 2005-58. May 2005.*

Scott Hoot. "GPGPU: Evolution of the Coprocessor." EE Times. Technical Paper. May 2009.*

Nabil R. Adam and John C. Worthmann. "Security-control methods for statistical databases: a comparative study." ACM Computing Surveys (CSUR) Surveys. vol. 21 Issue 4, Dec. 1989. pp. 515-556.*

Wayne A Fuller. Masking Procedures for Microdata Disclosure Limitation. Journal of Official Statistics. vol. 9. No. 2, 1993, pp. 383-406.*

* cited by examiner

FIG. 1

| OPERAND | PLAINTEXT $P_i$ | RANDOM PADS MULT $M_i$ | RANDOM PADS ADD $A_i$ | CIPHERTEXT $C_i$ |
|---|---|---|---|---|
| 1 | 5 | 3 | 10 | 15 |
| 2 | 7 | 1.1 | .7 | 7.7 |
| 3 | 10 | .4 | -6 | 4 |
| 4 | 11 | 9 | 88 | 99 |
| 5 | 6 | 3 | 12 | 18 |
| 6 | | | | |
| $n$ | | | | |

METHODS, SYSTEMS, AND COMPUTER PROGRAM PRODUCTS FOR PERFORMING HOMOMORPHIC ENCRYPTION AND DECRYPTION ON INDIVIDUAL OPERATIONS

BACKGROUND

The present disclosure relates generally to the field of data security, and, more particularly, to methods, systems, and computer program products for performing homomorphic encryption and decryption.

It may be said that computing has taken over all aspects of the global economy. Increasingly, outsourced or out-tasked models for computing have become more prevalent, for example, "cloud computing," in which an enterprise uses a third party's computing resources, such as servers and storage, to run an application under an on-demand, pay-per-use model, not unlike renting a car or hotel room.

One potential challenge in such a model is security. If an enterprise wants to run an application on some data, either the application may be proprietary, e.g., a trade secret trading algorithm used by a brokerage, or the data may be proprietary, e.g., customer purchases/identity information, or both. In the same way that a package transported by a third party logistics provider might get lost, data breaches have occurred where proprietary information is released to unauthorized recipients either accidentally or through the efforts of cyber-criminals.

A strategy for protecting data is encryption. Under traditional mechanisms the data may be encrypted at a point of origin in the enterprise data center and then carried across a network as ciphertext, but then must be decrypted at the point of destination to actually be processed. If the data is decrypted then the data is exposed to parties at the destination where the data is processed. If the data represents private or sensitive information then additional security measures may need to be taken to ensure that the data is not released to unauthorized parties.

One technique that may be used to allow third parties to process data in a secure manner is "homomorphic encryption," which has the property that mathematical operations performed on the ciphertext are homomorphic, that is, the operations generate a resulting ciphertext that can be decrypted to generate a plaintext which equals the same result as if those operations were performed on the unencrypted operands. An example would be an encryption process of doubling and a decryption process of halving. If the plaintext value is 3 then the ciphertext value is 6. For an addition process, 6+6+6 equals 18, which when decrypted, i.e., halved, yields 9, which is identical to 3+3+3.

A homomorphic encryption process has been published by Craig Gentry that uses perfect lattices to enable numerous mathematical operations to be performed on encrypted data. While of theoretical interest, this proposed encryption process generally involves complex mathematical calculations, which means that even the simplest computations can take relatively long time periods. Moreover, even with parallelism, the computational overhead may outweigh potential savings from using cloud services that otherwise could provide economies of scale.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the disclosure.

Some embodiments provide a method of processing data comprising receiving a request for an operand from a second processor at a first processor, encrypting the operand that has been requested using the first processor responsive to receiving the request for the operand, sending the operand that has been encrypted from the first processor to the second processor, receiving a result from the second processor at the first processor, the result generated from a single homomorphic operation being performed using the operand sent to the second processor, decrypting the result received from the second processor at the first processor, and receiving a request for the result that has been decrypted from the second processor at the first processor.

In other embodiments, the result is a first result and the single homomorphic operation is a single first homomorphic operation. The method further comprises encrypting the first result that has been requested using the first processor responsive to receiving the request for the first result, sending the first result that has been encrypted from the first processor to the second processor, receiving a second result from the second processor at the first processor, the second result generated from a single second homomorphic operation being performed using the first result sent to the second processor, and decrypting the second result received from the second processor at the first processor.

In still other embodiments, the first processor and second processor are coupled via an untrusted communication network.

In still other embodiments, the first processor and the second processor are in a same integrated circuit device.

In still other embodiments, the first processor and the second processor are separate virtual machines that execute on a common hardware platform.

In still other embodiments, each of the operand has a multiplicative encryption pad and an additive encryption pad associated therewith.

In still other embodiments, decrypting the result comprises selecting for the operand one of the multiplicative encryption pad and the additive encryption pad associated with the operand based on the single homomorphic operation and using the selected multiplicative encryption pad or additive encryption pad to decrypt the result.

In still other embodiments, the single homomorphic operation is an addition operation and wherein selecting for the operand one of the multiplicative encryption pad and the additive encryption pad comprises selecting for the operand, the additive encryption pad.

In still other embodiments, the single homomorphic operation is a multiplication operation and wherein selecting for the operand one of the multiplicative encryption pad and the additive encryption pad comprises selecting for the operand the multiplicative encryption pad.

In still other embodiments, the single homomorphic operation is a copy operation and wherein selecting for the operand one of the multiplicative encryption pad and the additive encryption pad comprises selecting for the operand the additive encryption pad.

In still other embodiments, the single homomorphic operation is a negation operation and wherein selecting for the operand one of the multiplicative encryption pad and the additive encryption pad comprises selecting for the operand the additive encryption pad.

In still other embodiments, the single homomorphic operation is an inversion operation and wherein selecting for the operand one of the multiplicative encryption pad and the additive encryption pad comprises selecting for the operand the multiplicative encryption pad.

In further embodiments, a data processing system comprises a memory comprising computer readable program code and a first processor that is coupled to the memory and is configured to execute the computer readable program code so as to cause the data processing system to receive a request for an operand from a second processor, to encrypt the operand that has been requested responsive to receiving the request for the operand, to send the operand that has been encrypted to the second processor, to receive a result from the second processor, the result generated from a single homomorphic operation being performed using the operand sent to the second processor, to decrypt the result received from the second processor, and to receive a request for the result that has been decrypted from the second processor at the first processor.

In still further embodiments, the first processor and second processor are coupled via an untrusted communication network.

In still further embodiments, the first processor and the second processor are in a same integrated circuit device.

In still further embodiments, the first processor and the second processor are separate virtual machines that execute on a common hardware platform.

In other embodiments, an article of manufacture comprises a non-transitory computer readable storage medium having computer readable program code embodied therein. The computer readable program code comprises computer readable program code configured to receive a request for an operand from a second processor at a first processor, computer readable program code configured to encrypt the operand that has been requested using the first processor responsive to receiving the request for the operand, computer readable program code configured to send the operand that has been encrypted from the first processor to the second processor, computer readable program code configured to receive a result from the second processor at the first processor, the result generated from a single homomorphic operation being performed using the operand sent to the second processor, computer readable program code configured to decrypt the result received from the second processor at the first processor, and computer readable program code configured to receive a request for the result that has been decrypted from the second processor at the first processor.

In still other embodiments, the first processor and second processor are coupled via an untrusted communication network.

In still other embodiments, the first processor and the second processor are in a same integrated circuit device.

In still other embodiments, the first processor and the second processor are separate virtual machines that execute on a common hardware platform.

Other methods, systems, devices, appliances, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of exemplary embodiments will be more readily understood from the following detailed description of specific embodiments thereof when read in conjunction with the accompanying drawings, in which.

DETAILED DESCRIPTION

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Exemplary embodiments may be embodied as methods, systems, and/or computer program products. Accordingly, exemplary embodiments may be embodied in hardware and/or in software (including firmware, resident software, microcode, etc.). Furthermore, exemplary embodiments may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Some embodiments described herein may provide methods, systems, and computer program products for performing homomorphic encryption and decryption on operands and results used in individual mathematical and/or logical operations. The encryption and decryption operations may generally involve a relatively small number of additional steps and the total computation times may scale linearly based on the number of processor instructions executed for an application. This may allow, for example, two parties to cooperate to generate a result without either party having to reveal private information to the other. For example, one party may have private data and wishes to have that data processed by a proprietary algorithm owned by another party. The first party has access to the data, but not the algorithm while the second party has access to the algorithm, but not the unencrypted data. The party owning the algorithm may access encrypted versions of the data and may perform homomorphic mathematical and/or logical operations on the data. After each individual homomorphic operation the result is returned to the data owner where it is unencrypted. The result may be encrypted again and provided to the algorithm owner should the algorithm need the result for further computations.

According to some embodiments for performing homomorphic encryption and decryption on operands and results used in individual mathematical and/or logical operations described herein, a set of n plaintext operands/variables $P_1$, $P_2$, ... $P_n$ are maintained by a first party. A mathematical transformation and encryption function E( ) uses dynamically (re)generated one-time random multiplicative pads, $R_1$, $R_2$, ... $R_n$ to generate a set of n ciphertext operands $C_1$, $C_2$, ... $C_n$, so that $C_i=E(P_i)=R_i*P_i$. Homomorphic operations may then be performed on the ciphertext, where, after each individual operation, the result is stored, decrypted, and potentially re-encrypted. Before and after every homomorphic operation, the relationship between P, R, and C ensures that $C_i=P_i*R_i$, except when $P_{i=0}$ there is special handling. As described below, a corresponding additive pad may be generated for each multiplicative pad. A decryption operation may use one or more multiplicative pad or one or more additive pad depending on the type of homomorphic operation that was performed on the ciphertext operand(s).

Figure 1:
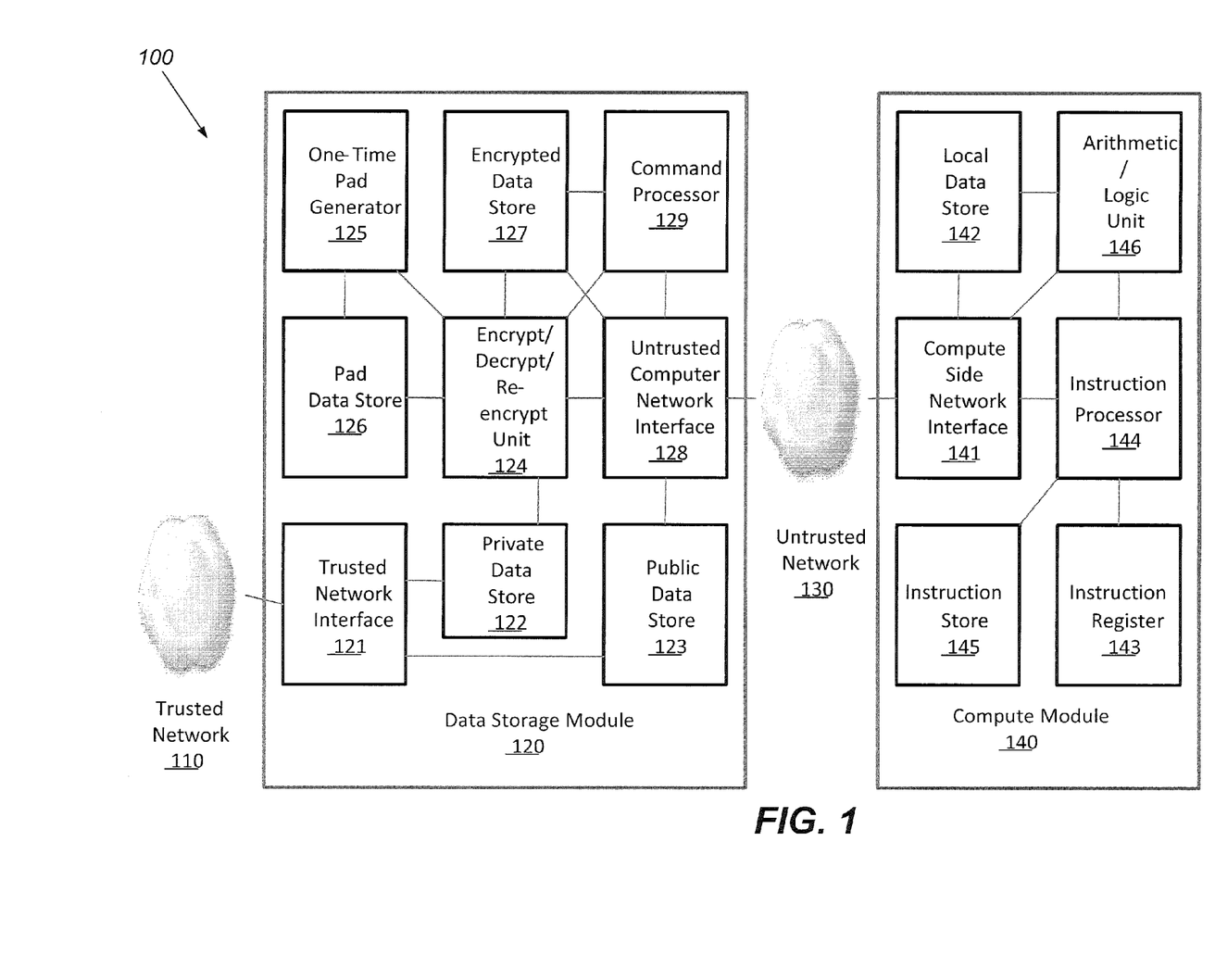
FIG. 1 is a block diagram that illustrates a system for performing homomorphic encryption and decryption on individual operations in accordance with some embodiments.

FIG. 1 is a block diagram of a system 100 for performing homomorphic encryption and decryption on individual operands and results of operations on operands in accordance with some embodiments. The system 100 comprises a trusted network 110, a data storage module 120, an untrusted network 130, and a compute module 140. Private data may exist elsewhere in the trusted environment (not shown), and arrive at the data storage module 120 via the trusted network 110. Such data may arrive as a single array, an array of structures, a relational database, Javascript Object Notation, XML, and/or other mechanisms according to various embodiments, and are reliably received or transmitted by a trusted network interface 121. Data may be assumed to be private, in which case it is all stored in a private data store 122, or may be a mix of private and public data, in which case markings or other means may be used to indicate which is private and should be stored in the private data store 122, and which is public and may be stored in a public data store 123. An encryption/decryption unit 124 encrypts private data from the private data store 122 using one-time pads generated by a one-time pad generator 125 which are saved in a pad data store 126. The encryption/decryption unit 124 also decrypts the resulting ciphertext data generated by the compute module 140 after performing a homomorphic operation on one or more encrypted operands provided by the data storage module 120. After encryption, encrypted data may be stored in an encrypted data store 127. Read requests for encrypted data or for public data are managed by an untrusted compute network interface 128, which can read from the Public Data Store 123, read from the encrypted data store 127, write to the public data store 123, and/or write to the encrypted data store 127 via a command processor 129. In accordance with various embodiments, the data storage module 120 may be implemented as a special purpose device or embedded system that can be used to provide data received from the trusted network 110 to the compute module 140 in a secure fashion or may be implemented as a logical part of general purpose computing system.

The compute module 140 includes an instruction processor 144, which fetches instructions from an instruction store 145 in accordance with the pointer contained in an instruction register 143. Some instructions are GoTos or jumps, which merely alter the value of the instruction register 143. Some are mathematical or logical operations, which then may involve the use of an arithmetic/logic Unit 146. The arithmetic/logic unit 146 may use local data for processing, such as data maintained in a local data store 142, for example, and/or temporary registers. The arithmetic/logic unit 146 may also need access to data in the data storage module 120. If so, it accesses either public data or encrypted private data via a compute-side network interface 141, which communications with the untrusted compute network interface 128 via the untrusted network 130.

It will be appreciated that these modules shown in FIG. 1 may be implemented in various ways and at various scales in accordance with various embodiments. For example, in one implementation, the trusted network 110 may be an enterprise data center LAN, the untrusted network 130 may be a public service provider's Wide Area Network, VPN service, and/or the Internet, components of the data storage module 120 may be built as software running on a hypervisor residing on a compute server while the private data store 122, public data store 123, and pad data store 126 may be implemented via one or more enterprise storage arrays.

The data storage module 120 and the compute module 140 are not limited to a particular type of implementation configuration. For example, in some embodiments, the data storage module 120 and the compute module 140 may be implemented as separate physical servers co-located in a single facility. The data storage module 120 and the compute module 140 may also be separated geographically in separate facilities, regions, or even countries. In yet other embodiments, the data storage module 120 and the compute module 140 may be implemented as separate virtual machines on a common hardware platform.

In still other embodiments, the entirety of the system 100 may be built as a "core" on a multi-core integrated circuit device, with the trusted network 110 implemented as an on-chip I/O port, the private data store 122 and the other data stores implemented as on-chip registers, and the untrusted network 130 implemented as on-chip data transport.

Thus, in accordance with various embodiments, the trusted network 110 and the untrusted network 130 may represent a global network, such as the Internet, or other publicly accessible network. The trusted network 110 and the untrusted network 130 may also, however, represent a wide area network, a local area network, an Intranet, or other private network, which may not accessible by the general public. Furthermore, the trusted network 110 and the untrusted network 130 may represent a combination of public and private networks or a virtual private network (VPN). It will be appreciated that in various alternate embodiments the untrusted network 130 may use low level bus commands to facilitate communications between the data storage module 120 and the compute module 140 when implemented on the same integrated circuit, or, for example, may use application layer software function calls when executed in a metro or wide-area context. Such calls or messages may be implemented as Remote Procedure Calls, SOAP/XML messages, or other means. The encrypt/decrypt unit 124, one-time pad generator 125, command processor 129, instruction processor 144, and arithmetic/logic unit 146 may be implemented as one or more commercially available or custom microprocessors. The private data store 122, public data store 123, pad data store 126, encrypted data store 127, local data store 142, and instruction store 145 comprises memory that is representative of the one or more memory devices containing software and data used for performing homomorphic encryption and decryption on individual operations in accordance with some embodiments. This memory may include, but is not limited to, the following types of devices: cache, ROM, PROM, EPROM, EEPROM, flash, SRAM, and DRAM.

Although FIG. 1 illustrates an exemplary system for performing homomorphic encryption and decryption on individual operations in accordance with some embodiments, it will be understood that embodiments of the present invention are not limited to such configurations, but are intended to encompass any configuration capable of carrying out the operations described herein.

Figure 2:
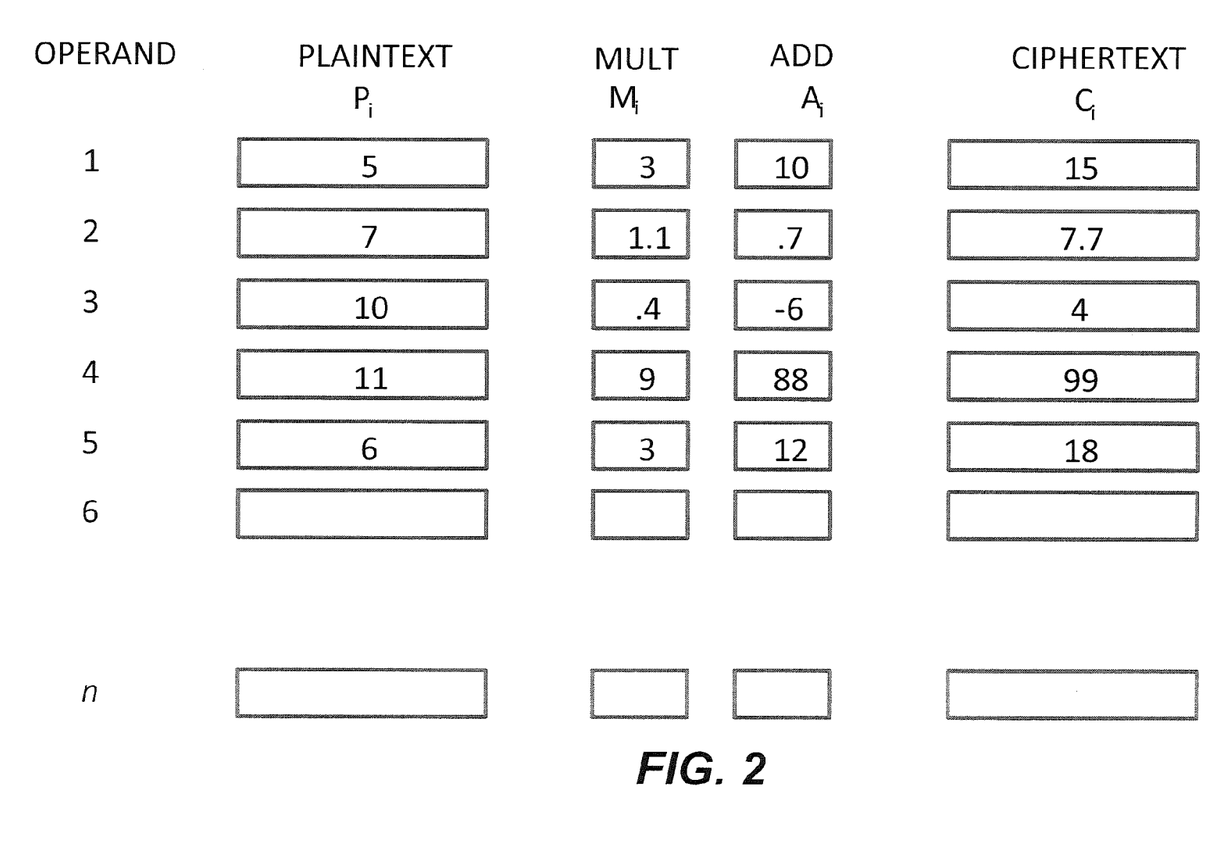
FIG. 2 is a diagram that illustrates encryption of operands using associated multiplicative and additive pads according in accordance with some embodiments.

FIG. 2 is a diagram that illustrates encryption of operands using associated multiplicative and additive pads according in accordance with some embodiments. As shown in FIG. 2, there are n operands 1 through n that exist in plaintext $P_i$ and Ciphertext $C_i$. $P_i$ and $C_i$ may be related by two random pads $M_i$ and $A_i$. $M_i$ is the multiplicative pad and $A_i$ is the additive pad, such that $P_i + A_i = C_i$ and $P_i * M_i = C_i$. Such a pair of pads may be generated as follows:

If $P_i <> 0$ generate a non-zero random pad $M_i$. Generate $C_i$ from $P_i$ and $M_i$ by setting $C_i$ to $P_i * M_i$. Then, determine $A_i$ as $C_i - P_i$. For example, suppose $P_i$ is 7. Generate a random $M_i$, such as 3.1. Then, generate $C_i$ as $P_i * M_i$, namely 7 *3.1=21.7. Then, determine $A_i$ as $C_i - P_1$, namely 21.7−7 which is 14.7. Now $P_{i=7}$, $M_{i=3.1}$, $A_{i=14.7}$, and =21.7. Thus, the desired relationships hold. It will be appreciated that Ai may be generated first to be not equal to—$P_i$, and then $M_i$ generated as a dependent variable.

Although the operations shown here are conducted on rational numbers, such as 7 *3.1=21.7, it may be appreciated that in other embodiments the plaintext values and the ciphertext values may all be integers, with the one-time pads being either integers or rational numbers. As an example, if $P_i$ is 7, the random $M_i$ may be selected to be 3, so that $C_i$ is 7 *3=21. Then, $A_i$ is 21−7 which is 14. It will be appreciated, however, that an untrusted process running on a second processor may then use unique factorization to deduce over time that $P_i$ is 7.

To prevent this, rational numbers that are fractions may be generated, thus "blinding" the second processor to the value of the private data. For example, a one-time pad $M_i$ of 4/7 may be used, generating a $C_i$ that is 7*4/7=4, and therefore $A_i$ of 4−7=−3. To achieve this, the plaintext operand is uniquely factored, and a pad is generated by creating a fraction whose numerator is a randomly generated non-zero integer and whose denominator is a randomly selected divisor of the prime factors of $P_i$.

If $P_{i=0}$, a different method is used. First, generate a non-zero random pad $A_i$. Then, set $C_i$ to equal $P_i + A_i$. Mark $M_i$ as N/A as it will be ignored during subsequent calculations. It will be understood that $P_i$ cannot be determined by an untrusted process that can only view the ciphertext $C_i$. FIG. 2 illustrates various examples of plaintext values and ciphertext values generated using multiplicative or additive pads. Because the one-time pads are not visible to the untrusted process, they cannot be "backed out" to generate $P_i$ from $C_i$. However, ciphertext can be used in mathematical and/or logical operations to generate homomorphically encrypted results, which then may be decrypted to determine equivalent plaintext results.

Computer program code for carrying out operations of data processing systems discussed above with respect to FIGS. 1 and 2 may be written in a high-level programming language, such as Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. Embodiments described herein, however, are not limited to any particular programming language. It will be further appreciated that the functionality of any or all of the program modules may also be implemented using discrete hardware components, one or more application specific integrated circuits (ASICs), or a programmed digital signal processor or microcontroller.

Exemplary embodiments are described herein with reference to flowchart and/or block diagram illustrations of methods, systems, and computer program products in accordance with exemplary embodiments. These flowchart and/or block diagrams further illustrate exemplary operations for performing homomorphic encryption and decryption on individual operations, in accordance with some embodiments. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 3:
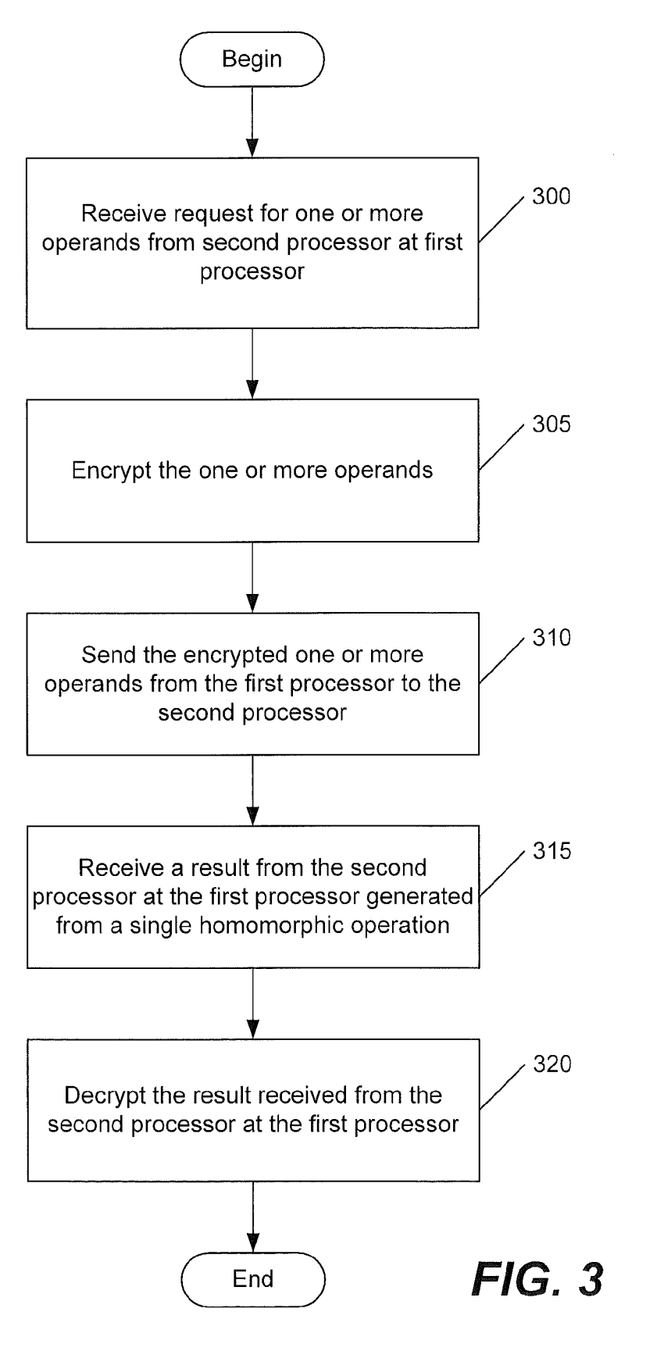
FIGS. 3-10 are flowcharts that illustrate operations for performing homomorphic encryption and decryption on individual operations in accordance with some embodiments.

Referring now to FIG. 3 and FIG. 1, exemplary operations for performing homomorphic encryption and decryption on individual operations in accordance with some embodiments begin at block 300 where the data storage module 120 receives a request for one or more operands from the compute module 140. The encrypt/decrypt unit 124 encrypts the one or more operands at block 305 and sends the encrypted one or more operands to the compute module via the untrusted computer network interface 128 over the untrusted network 130 at block 310. After the compute module 140 performs a single homomorphic operation on the one or more operands using the instruction processor 144 and/or the arithmetic/logic unit 146, the result of the single homomorphic operation is sent to the data storage module 120 via the compute side network interface 141 over the untrusted network 130 where it is received by the data storage module 120 at block 315. The encrypt/decrypt unit 124 decrypts the result received from the compute module 140 at block 320. The decrypted result may be stored in the private data store 122, public data store 123, or may be re-encrypted and stored in the encrypted data store 127 where it may be provided as an operand to the compute module 140 for use in a subsequent computation.

Figure 4:
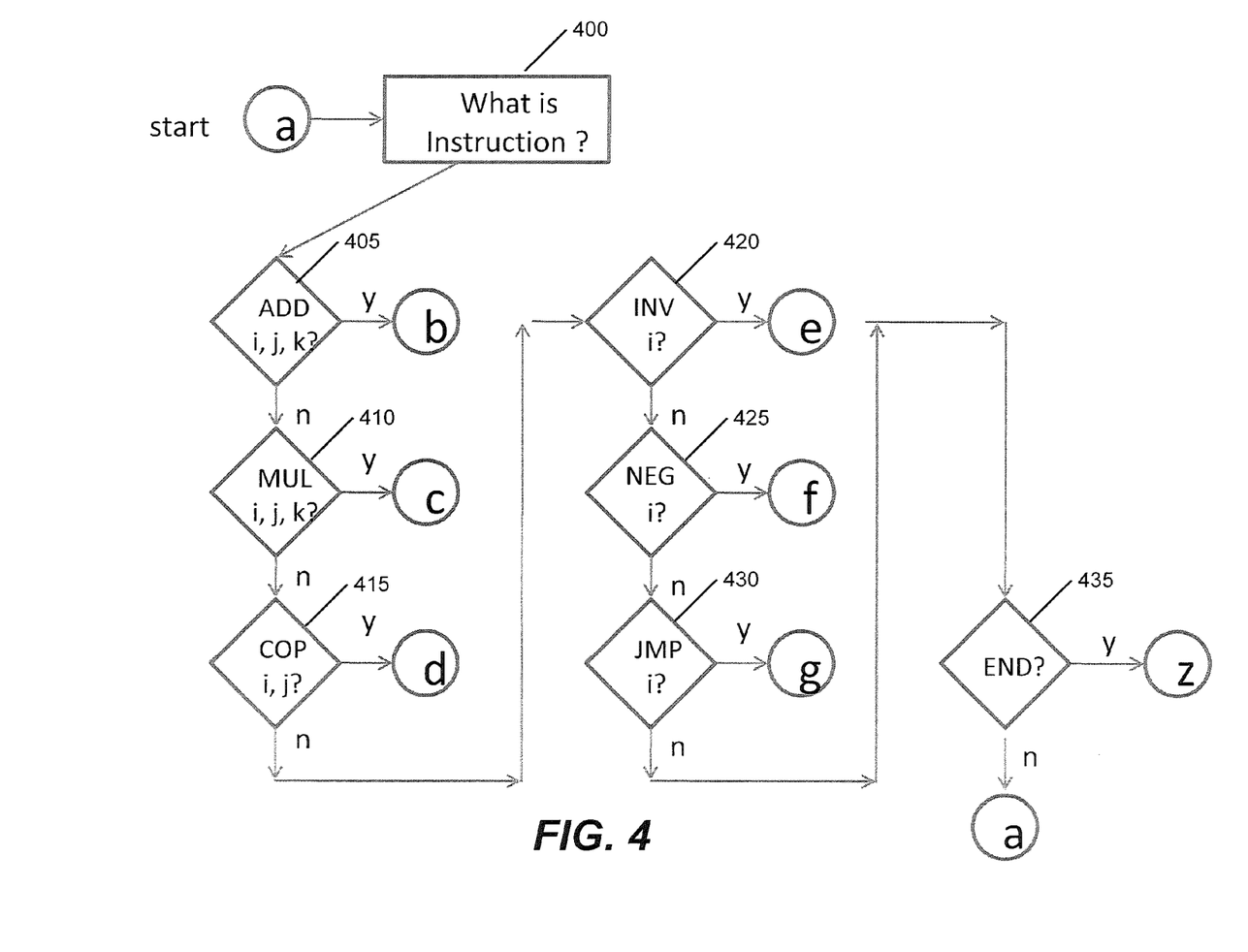
Figure 5:
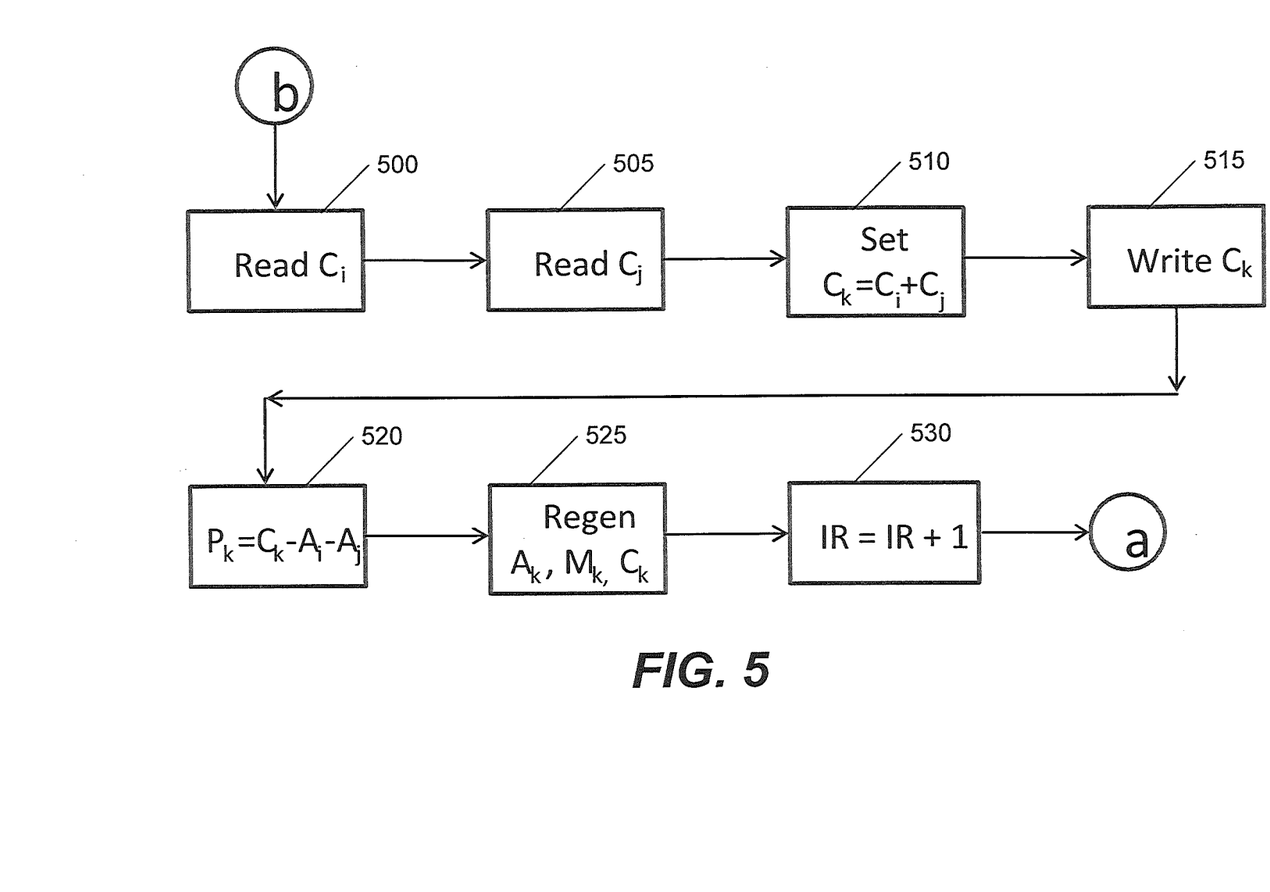

Example homomorphic operations that may be performed by the compute module 140 include, but are not limited to, the following types of machine language instructions, which reside at numbered instruction addresses:

ADD operand1, operand2, result
MULTIPLY operand1, operand2, result
COPY operand1, operand2
INVERT operand1, result
NEGATE operand1, result
GOTO instruction_number
END FIGS. 4-10 are flowcharts that illustrate operations in executing these machine language instructions on the compute module 140 using encrypted operands provided by the data storage module 120 according to some embodiments. Referring to FIGS. 4 and 1, operations begin at block 400 where the instruction processor 144 reads an instruction from the instruction store 145 based on the value of the instruction register 143 to determine the type of instruction. If the operation is an add instruction as determined at block 405, then operations continue at FIG. 5 where first and second ciphertext operands $C_i$ and $C_j$ are read from the data storage module 120 at blocks 500 and 505, respectively. The arithmetic/logic unit 146 generates the resulting sum $C_k$ at block 510 and writes the result $C_k$ to the data storage module 120 at block 515. The encrypt/decrypt unit 124 decrypts the result $C_k$ at block 520 by subtracting the additive pads $A_i$ and $A_j$ from the result $C_k$, to generate the plaintext value $P_k$ at block 520. New pads $A_k$ and $M_k$ may be generated for the resulting plaintext value $P_k$ at block 525 and the plaintext result may be encrypted to generate a ciphertext value $C_k$. The instruction register 143 is incremented at block 530 to process the next instruction.

Figure 6:
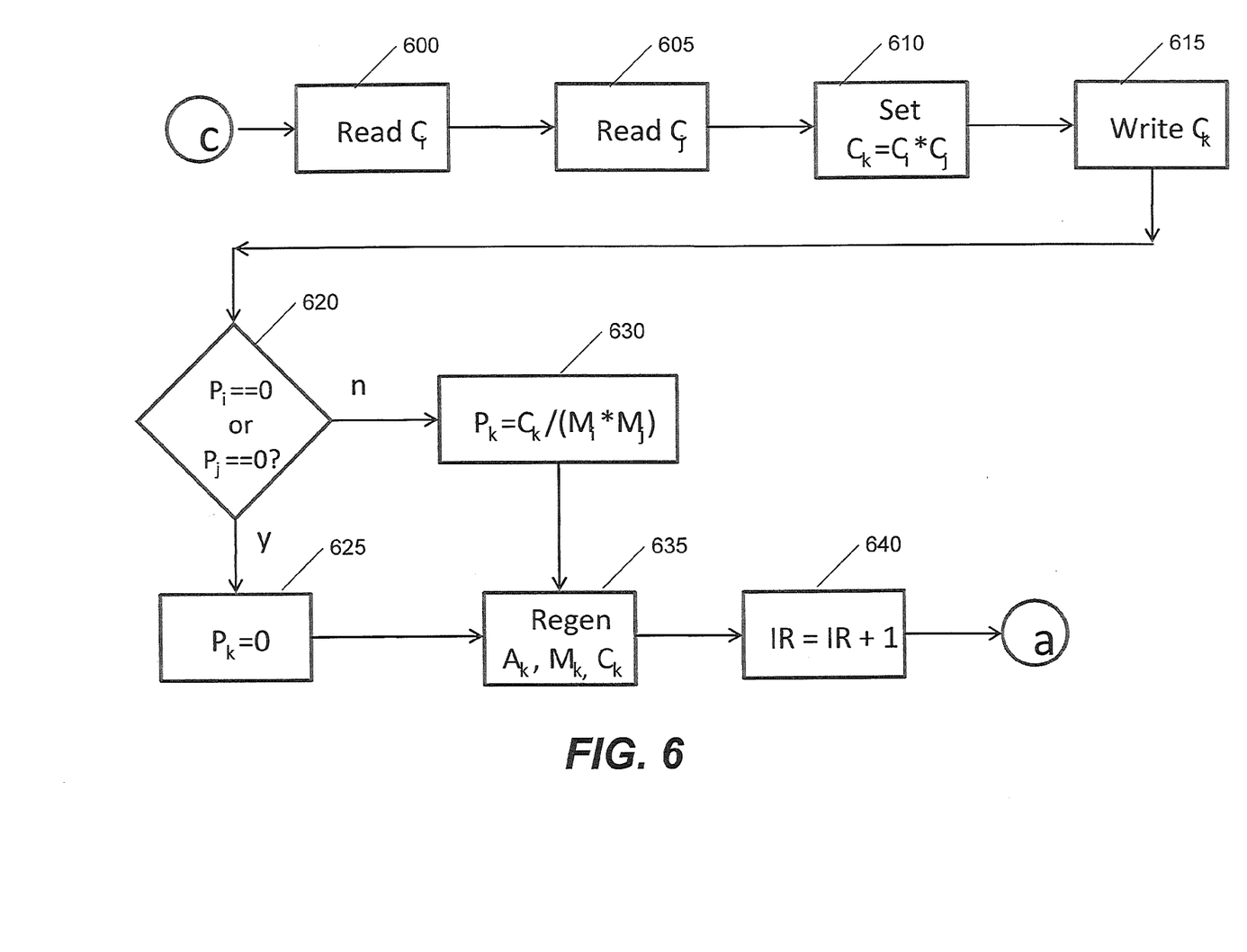

Returning to FIG. 4, if the operation is a multiply operation as determined at block 410, then operations continue at FIG. 6 where first and second ciphertext operands $C_i$ and $C_j$ are read from the data storage module 120 at blocks 600 and 605, respectively. The arithmetic/logic unit 146 generates the resulting product $C_k$ at block 510 and writes the result $C_k$ to the data storage module 120 at block 615. If both of the plaintext operands were non-zero as determined at block 620, then the encrypt/decrypt unit 124 decrypts the result $C_k$ at block 520 by dividing the result $C_k$ by the multiplicative pads $M_i$ and $M_j$ to generate the plaintext value $P_k$ at block 630. If, however, at least one of the plaintext operands was zero, then the decrypted result $P_k$ is set to zero at block 625. New pads $A_k$ and $M_k$ may be generated for the resulting plaintext value $P_k$ at block 635 and the plaintext result may be encrypted to generate a ciphertext value $C_k$. The instruction register 143 is incremented at block 640 to process the next instruction.

Figure 7:
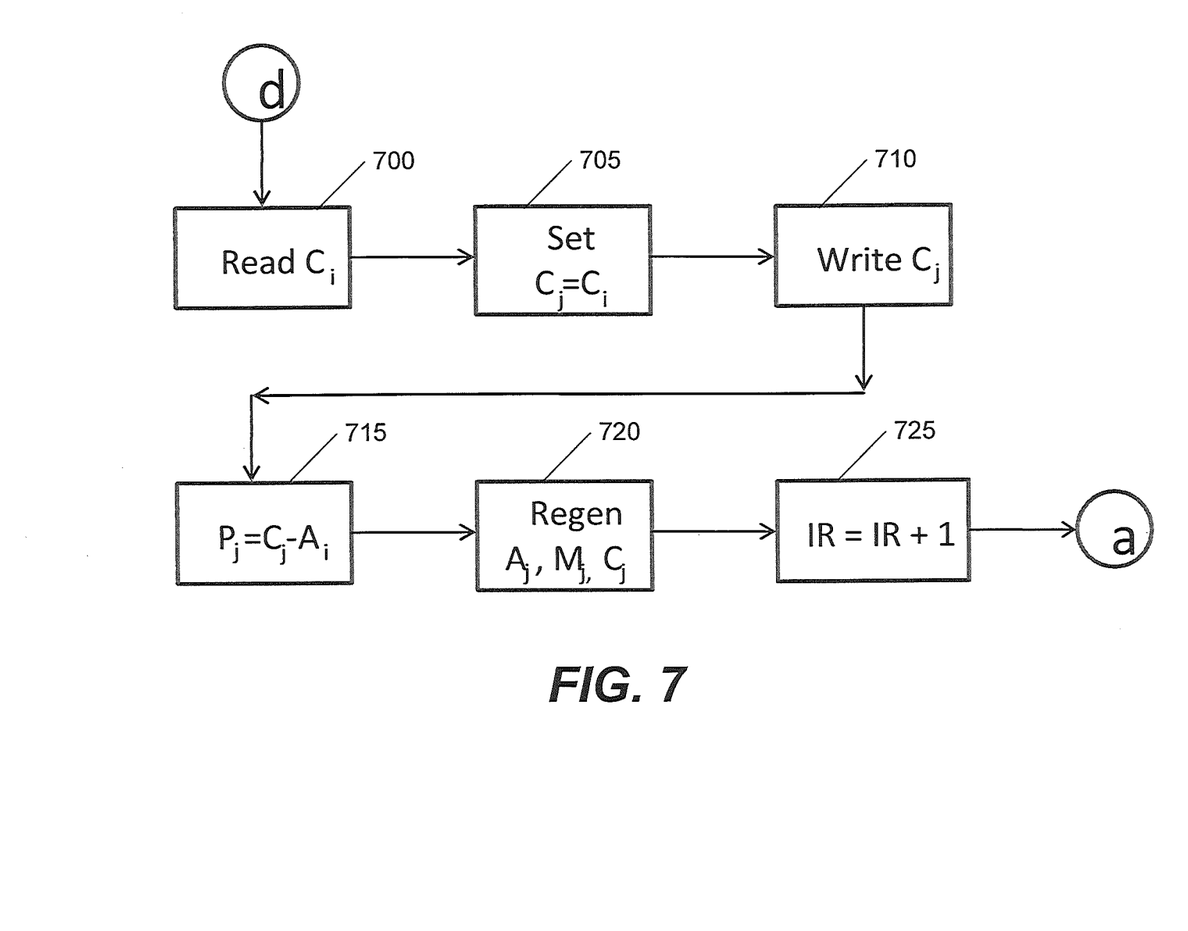

Returning to FIG. 4, if the operation is a copy operation as determined at block 415, then operations continue at FIG. 7 where a first ciphertext operand $C_i$ is read from the data storage module 120 at block 700. The arithmetic/logic unit 146 copies the ciphertext operand $C_i$ to $C_j$ at block 705 and writes the result $C_j$ to the data storage module 120 at block 710. The encrypt/decrypt unit 124 decrypts the result $C_j$ by subtracting the additive pad $A_i$ from the result $C_j$ to generate the plaintext value $P_j$ at block 715. New pads $A_j$ and $M_j$ may be generated for the resulting plaintext value $P_j$ at block 720 and the plaintext result may be encrypted to generate a ciphertext value $C_j$. The instruction register 143 is incremented at block 725 to process the next instruction.

Figure 8:
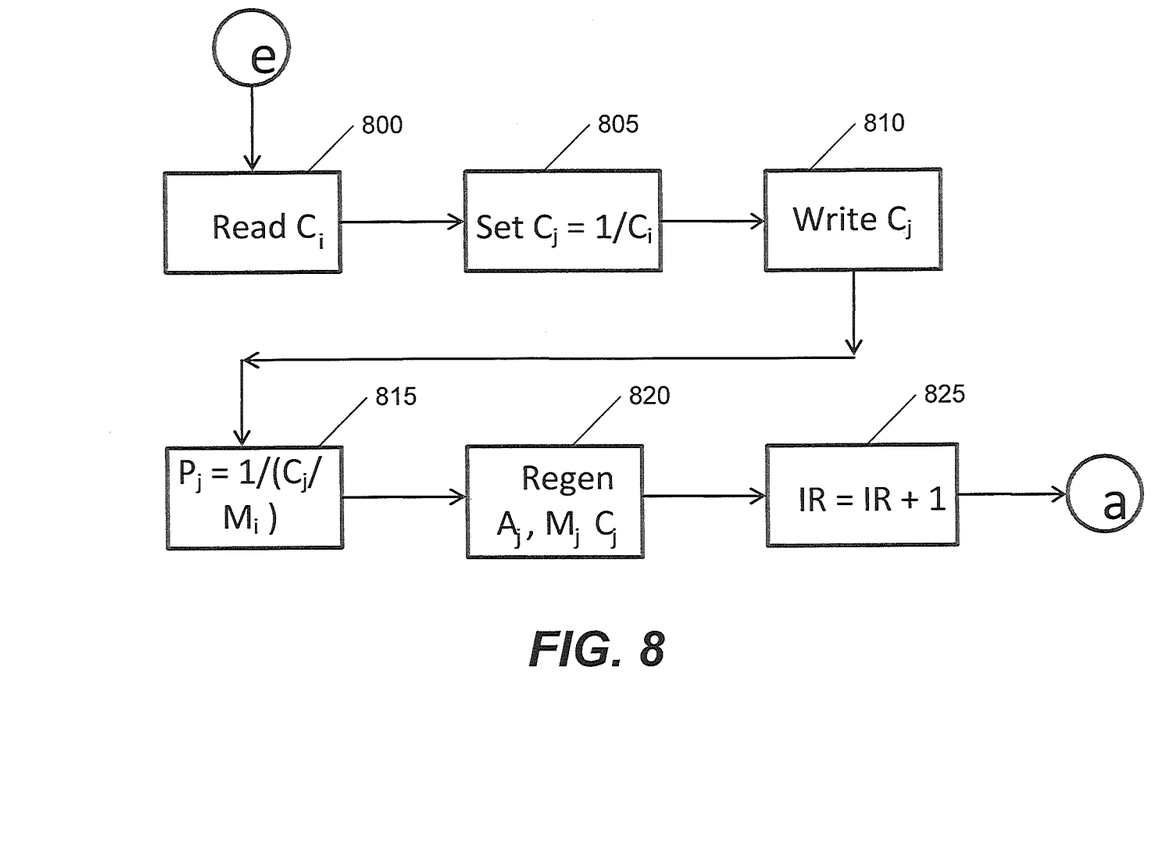

Returning to FIG. 4, if the operation is an invert operation as determined at block 420, then operations continue at FIG. 8 where a first ciphertext operand $C_i$ is read from the data storage module 120 at block 800. The arithmetic/logic unit 146 inverts the ciphertext operand $C_i$ to generate $C_j$ at block 805 and writes the result $C_j$ to the data storage module 120 at block 810. The encrypt/decrypt unit 124 decrypts the result $C_j$ at block 815 by dividing the result $C_j$ by the multiplicative pad $M_i$ and then inverting this intermediate result to generate the plaintext value $P_j$ at block 815. New pads $A_j$ and $M_j$ may be generated for the resulting plaintext value $P_j$ at block 820 and the plaintext result may be encrypted to generate a ciphertext value $C_j$. The instruction register 143 is incremented at block 825 to process the next instruction.

Figure 9:
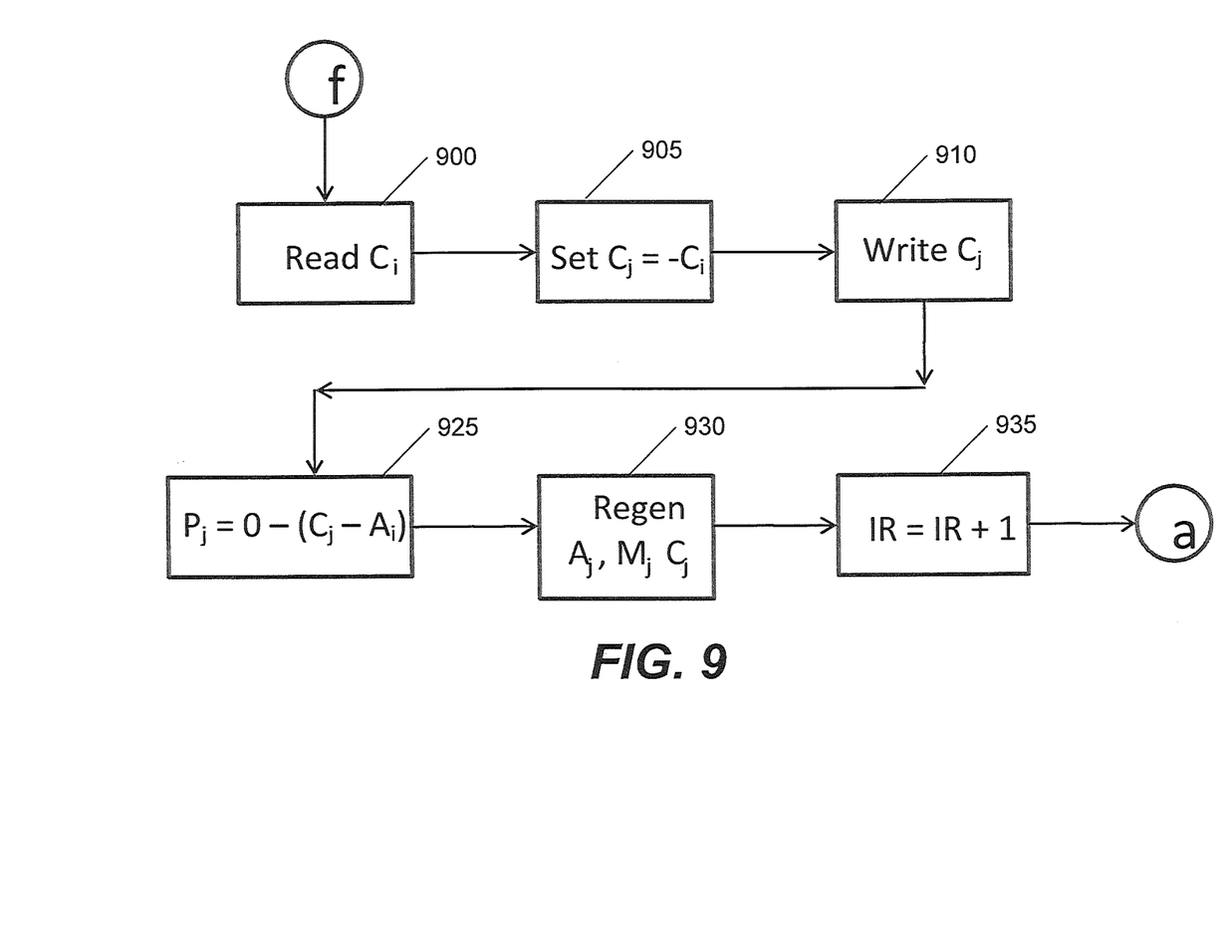

Returning to FIG. 4, if the operation is a negate operation as determined at block 425, then operations continue at FIG. 9 where a first ciphertext operand $C_i$ is read from the data storage module 120 at block 900. The arithmetic/logic unit 146 negates the ciphertext operand $C_i$ to generate $C_j$ at block 905 and writes the result $C_j$ to the data storage module 120 at block 910. The encrypt/decrypt unit 124 decrypts the result $C_j$ by subtracting the additive pad $A_i$ from the result $C_j$ and then subtracting this intermediate result from zero to generate the plaintext value $P_j$ at block 925. New pads $A_j$ and $M_j$ may be generated for the resulting plaintext value $P_j$ at block 930 and the plaintext result may be encrypted to generate a ciphertext value $C_j$. The instruction register 143 is incremented at block 935 to process the next instruction.

Figure 10:
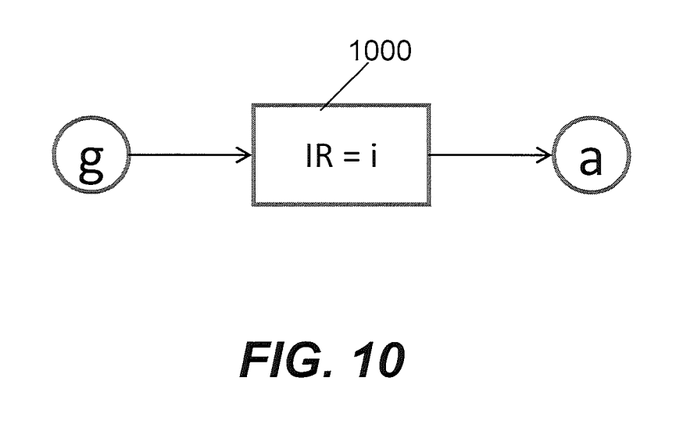

Returning to FIG. 4, if the operation is a jump operation as determined at block 430, then operations continue at FIG. 10 where the instruction register 143 is set to the new address at block 1000.

Returning to FIG. 4, operations end if a determination is made at block 435 that program execution is complete.

The flowcharts of FIGS. 4-10 illustrate the architecture, functionality, and operations of some embodiments of methods, systems, and computer program products for performing homomorphic encryption and decryption on individual operations. In this regard, each block represents a module, segment, or portion of code, which comprises one or more executable instructions for implementing the specified logical function(s). It should also be noted that in other implementations, the function(s) noted in the blocks may occur out of the order noted in FIGS. 4-10. For example, two blocks shown in succession may, in fact, be executed substantially concurrently or the blocks may sometimes be executed in the reverse order, depending on the functionality involved.

The foregoing examples described with respect to FIGS. 4-10 illustrate single homomorphic operations that can be performed on encrypted operands and then the encrypted results decrypted to generate plaintext results in accordance with some embodiments of the present invention. It will be understood, however, that these examples are for purposes of illustration and other homomorphic mathematical and/or logical operations may also be used.

The flowcharts of FIGS. 3-10 illustrate the architecture, functionality, and operations of some embodiments of methods, systems, and computer program products for performing homomorphic encryption and decryption on operands and results used in individual mathematical and/or logical operations. In this regard, each block represents a module, segment, or portion of code, which comprises one or more executable instructions for implementing the specified logical function(s). It should also be noted that in other implementations, the function(s) noted in the blocks may occur out of the order noted in FIGS. 3-10. For example, two blocks shown in succession may, in fact, be executed substantially concurrently or the blocks may sometimes be executed in the reverse order, depending on the functionality involved.

According to the embodiments described herein encrypted data may be provided to an external party for processing without that party having visibility into the original plaintext data. The external party may generate results based on the encrypted data, which can be provided back to the party owning the original plaintext data. The encrypted results can be decrypted by the owner of the plaintext data to obtain values that are the same as if the external party had processed the original plaintext data directly. This may allow data owners to transmit their data to third parties operating "cloud computing" centers where the data may be processed without breaching any confidentiality associated with the data.

It will be appreciated that the systems, methods, and computer program products described above generally, and the one-time pads and specific set of operators described above specifically, may enable fully secure processing by the second processor of operations including multiplication and addition. It is known that such operations are the only operations required to compute a "boolean circuit," and thus suffice to perform any general computation.

Moreover, the one-time pads ensure that the second processor cannot determine any information regarding the private unencrypted data. However, this core "trusted" set of operations can be expanded to include public data or operations that do not singly reveal any information. Such variations may be desirable for some computations. As an example, consider a general purpose function, such as calculating x to the nth power, $x^n$. The two things that are required are x and n—x can be encrypted, but n must be known. For this purpose, the public data store 123 may be used with the untrusted computer network Interface 128 accessing private encrypted data from the encrypted data store 127 (in this case, the "x") and public data from the public data store 123 (in this case, the "n"). It will be appreciated that, in conjunction with such use, additional operations may be provided to extend the instruction set that the instruction processor 144 may recognize. These may include, but are not limited to, instructions such as the following:

INCREMENT operand1
DECREMENT operand1
JUMP ON ZERO operand1, instruction_number
JUMP ON LESS THAN ZERO operand1, instruction_number This is a representative set of operations and is intended to be illustrative, not limiting. It will be appreciated that the command processor 129, with knowledge of which data is private and which is public, may adjust calculations accordingly to permit mixed operations, such as "MULTIPLY encrypted_operand, unencrypted_operand, result." Not only may the embodiments described herein be used in their pure form, but as a hybrid that comprises encrypted and unencrypted portions, and, in the limit, may be capable of executing the entire instruction set of any modern processor.

Many variations and modifications can be made to the preferred embodiments without substantially departing from the principles of the present invention. All such variations and modifications are intended to be included herein within the scope of the present invention, as set forth in the following claims.

That which is claimed:

1. A method of processing data, comprising:
receiving a request for an operand from a second processor at a first processor;
randomly generating a non-zero integer;
determining prime factors of the operand;
randomly selecting a divisor of the prime factors of the operand;
encrypting the operand that has been requested using the first processor responsive to receiving the request for the operand;
sending the operand that has been encrypted from the first processor to the second processor;
receiving a result from the second processor at the first processor, the result generated from a single homomorphic operation being performed using the operand sent to the second processor;
decrypting the result received from the second processor at the first processor;
storing the result that has been decrypted in a data store; and
receiving a request for the result that has been decrypted from the second processor at the first processor;
wherein encrypting the operand comprises encrypting the operand using a pad that comprises a fraction whose numerator is the non-zero integer and whose denominator is the divisor of the prime factors of the operand.

2. The method of claim 1, wherein the result is a first result and the single homomorphic operation is a single first homomorphic operation, the method further comprising:
encrypting the first result that has been requested using the first processor responsive to receiving the request for the first result;
sending the first result that has been encrypted from the first processor to the second processor;
receiving a second result from the second processor at the first processor, the second result generated from a single second homomorphic operation being performed using the first result sent to the second processor; and
decrypting the second result received from the second processor at the first processor.

3. The method of claim 1, wherein the first processor and second processor are coupled via an untrusted communication network.

4. The method of claim 3, wherein the first processor and the second processor are separate virtual machines that execute on a common hardware platform.

5. The method of claim 1, wherein the first processor and the second processor are in a same integrated circuit device.

6. The method of claim 1, wherein the pad is a multiplicative encryption pad, the method further comprising:
generating an additive encryption pad based on the operand and the operand that has been encrypted.

7. The method of claim 6, wherein decrypting the result comprises:
selecting one of the multiplicative encryption pad and the additive encryption pad based on the single homomorphic operation; and
using one of the selected multiplicative encryption pad and additive encryption pad to decrypt the result.

8. The method of claim 7, wherein the single homomorphic operation is an addition operation and wherein selecting one of the multiplicative encryption pad and the additive encryption pad comprises selecting the additive encryption pad.

9. The method of claim 7, wherein the single homomorphic operation is a multiplication operation and wherein selecting one of the multiplicative encryption pad and the additive encryption pad comprises selecting the multiplicative encryption pad.

10. The method of claim 7, wherein the single homomorphic operation is a copy operation and wherein selecting one of the multiplicative encryption pad and the additive encryption pad comprises selecting the additive encryption pad.

11. The method of claim 7, wherein the single homomorphic operation is a negation operation and wherein selecting one of the multiplicative encryption pad and the additive encryption pad comprises selecting the additive encryption pad.

12. The method of claim 7, wherein the single homomorphic operation is an inversion operation and wherein selecting one of the multiplicative encryption pad and the additive encryption pad comprises selecting the multiplicative encryption pad.

13. A data processing system, comprising:
a memory comprising computer readable program code; and
a first processor that is coupled to the memory and is to execute the computer readable program code so as to cause the data processing system to perform operations comprising:
receiving a request for an operand from a second processor at the first processor;
randomly generating a non-zero integer;
determining prime factors of the operand;
randomly selecting a divisor of the prime factors of the operand;
encrypting the operand that has been requested using the first processor responsive to receiving the request for the operand;
sending the operand that has been encrypted from the first processor to the second processor;
receiving a result from the second processor at the first processor, the result generated from a single homomorphic operation being performed using the operand sent to the second processor;
decrypting the result received from the second processor at the first processor;
storing the result that has been decrypted in a data store; and
receiving a request for the result that has been decrypted from the second processor at the first processor;
wherein encrypting the operand comprises encrypting the operand using a pad that comprises a fraction whose numerator is the non-zero integer and whose denominator is the divisor of the prime factors of the operand.

14. The data processing system of claim 13, wherein the first processor and second processor are coupled via an untrusted communication network, 15. The data processing system of claim 13, wherein the first processor and the second processor are in a same integrated circuit device.

16. The data processing system of claim 15, wherein the first processor and the second processor are separate virtual machines that execute on a common hardware platform.

17. An article of manufacture, comprising:
a non-transitory computer readable storage medium having computer readable program code embodied therein, the computer readable program code when executed by a first processor causing the first processor to perform operations comprising:
receiving a request for an operand from a second processor at a first processor;
randomly generating a non-zero integer;
determining prime factors of the operand;
randomly selecting a divisor of the prime factors of the operand;
encrypting the operand that has been requested using the first processor responsive to receiving the request for the operand;
sending the operand that has been encrypted from the first processor to the second processor;
receiving a result from the second processor at the first processor, the result generated from a single homomorphic operation being performed using the operand sent to the second processor;
decrypting the result received from the second processor at the first processor;
storing the result that has been decrypted in a data store; and
receiving a request for the result that has been decrypted from the second processor at the first processor;
wherein encrypting the operand comprises encrypting the operand using a pad that comprises a fraction whose numerator is the non-zero integer and whose denominator is the divisor of the prime factors of the operand.

18. The article of manufacture of claim 17, wherein the first processor and second processor are coupled via an untrusted communication network.

19. The article of manufacture of claim 17, wherein the first processor and the second processor are in a same integrated circuit device.

20. The article of manufacture of claim 19, wherein the first processor and the second processor are separate virtual machines that execute on a common hardware platform.

* * * * *

UNITED STATES PATENT AND TRADEMARK OFFICE
CERTIFICATE OF CORRECTION

| | | |
|---|---|---|
| PATENT NO. | : 8,681,973 B2 | Page 1 of 1 |
| APPLICATION NO. | : 12/882753 | |
| DATED | : March 25, 2014 | |
| INVENTOR(S) | : Weinman | |

It is certified that error appears in the above-identified patent and that said Letters Patent is hereby corrected as shown below:

In the Claims:

Column 14, Claim 14, Line 11: Please correct "network,"
to read -- network. --

Column 14, Claim 17, Line 25: Please correct "at a first processor;"
to read -- at the first processor; --

Signed and Sealed this
Twelfth Day of August, 2014

Michelle K. Lee
*Deputy Director of the United States Patent and Trademark Office*